United States Patent
Barua et al.

(10) Patent No.: US 11,010,287 B1
(45) Date of Patent: May 18, 2021

(54) FIELD PROPERTY EXTRACTION AND FIELD VALUE VALIDATION USING A VALIDATED DATASET

(71) Applicant: Intuit Inc., Mountain View, CA (US)

(72) Inventors: Trilokesh Barua, Bangalore (IN); Linu Mathew Koshy, Bangalore (IN); Mohit Mayank, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/459,211

(22) Filed: Jul. 1, 2019

(51) Int. Cl.
*G06F 11/36* (2006.01)
*G06N 20/00* (2019.01)

(52) U.S. Cl.
CPC ...... *G06F 11/3692* (2013.01); *G06F 11/3688* (2013.01); *G06N 20/00* (2019.01)

(58) Field of Classification Search
CPC ...... G06F 11/34; G06F 11/3452; G06F 11/36; G06F 11/3612; G06F 11/3616–364; G06F 11/3688; G06F 11/3692; G06N 20/00
See application file for complete search history.

(56) References Cited

U.S. PATENT DOCUMENTS

| | | | | |
|---|---|---|---|---|
| 9,032,259 | B1 * | 5/2015 | Hood | G06F 11/3692 714/57 |
| 2007/0028217 | A1 * | 2/2007 | Mishra | G06F 11/3688 717/124 |
| 2011/0035371 | A1 * | 2/2011 | Pong | G06F 16/2365 707/722 |
| 2014/0208218 | A1 * | 7/2014 | Carasso | G06F 3/04842 715/738 |
| 2019/0102683 | A1 * | 4/2019 | Jayaraman | G06F 16/285 |
| 2019/0387012 | A1 * | 12/2019 | Orihara | G06F 21/55 |

OTHER PUBLICATIONS

Bille et al., "Fast and compact regular expression matching", published by Theoretical Computer Science 409 (2008), pp. 486-496 (Year: 2008).*

* cited by examiner

*Primary Examiner* — S. Sough
*Assistant Examiner* — Zheng Wei
(74) *Attorney, Agent, or Firm* — Ferguson Braswell Fraser Kubasta PC

(57) ABSTRACT

A method includes executing, multiple times, a target application with at least one test input dataset to obtain multiple test output datasets. The test output data sets each include multiple field values for multiple fields. The method further includes comparing the field values with at least one validated output dataset to assign the fields into a match class, an ignore class, and an unknown class, extracting, from the comparing, a field property for a first subset of the fields in the match class, and generating a test result by adding, to the test result, whether a first subset of the field values corresponding to the first subset of the fields satisfies a corresponding field property, and ignoring a second subset of the a second subset of fields classified in the ignore class. The method further includes presenting the test result.

18 Claims, 13 Drawing Sheets

```
1202 Validated Output Dataset                          1204 Test Output Dataset
{                                                      {
  "cachedListTimeStamps": {                              "cachedListTimeStamps": {
    "item": 1531294820000,                                 "item": 1538391807000,
    "taxrate": 0,                                          "taxrate": 0,
    "journalcode": 1531294821000,                          "journalcode": 1538391807000,
    "discountrate": 0,                                     "discountrate": 0,
    "taxagency": 0,                                        "taxagency": 0,
    "memreportgroup": 0,                                   "memreportgroup": 0,
    "name": 1531308257000,                                 "name": 1538452972000,
    "location": 0,                                         "location": 0,
    "taxcode": 0,                                          "taxcode": 0,
    "term": 1531294811000,                                 "term": 1538391800000,
    "account": 1531294826000,                              "account": 1538391810000,
    "paymentmethod": 1531294820000                         "paymentmethod": 1538391806000
  },                                                     },
  "priorSavedTxn": {                                     "priorSavedTxn": {
    "cachedListTimeStamps": {                              "cachedListTimeStamps": {
      "item": 1531294820000,                                "item": 1538391807000,
      "taxrate": 0,                                         "taxrate": 0,
      "journalcode": 1531294821000,                         "journalcode": 1538391807000,
      "discountrate": 0,                                    "discountrate": 0,
      "taxagency": 0,                                       "taxagency": 0,
      "name": 1531308257000,                                "name": 1538452972000,
      "taxcode": 0,                                         "taxcode": 0,
      "term": 1531294811000,                                "term": 1538391800000,
      "account": 1531294826000,                             "account": 1538391810000,
      "paymentmethod": 1531294820000                        "paymentmethod": 1538391806000
    },                                                   },
  "createdTime": "01:24 PM Jul 11, 2018",                "createdTime": "06:02 AM Oct 2, 2018",
  "lastUpdatedTime": "01:24 PM Jul 11, 2018"             "lastUpdatedTime": "06:02 AM Oct 2, 2018"
}                                                      }
```

Key
- Matched field
- *Ignored field*
- Should match, and have different values
- Present only in golden response
- Present only in test output

```
"total": 15694,
  "max_score": 1,                                    1400
  "hits": [
    { "_index": "hubble_validator_training_model",
      "_type": "data",
      "_id": "lkxznyjtva563286112885820",
      "_score": 1,
      "_source": {
        "id": "t5s1rubcee563286118056798",
        "endpoint": "/qbo15/neoservice/settings",
        "field": "$.supportedCurrencies.[*].label",
        "nMatched": "314",
        "nMissing": "1",
        "nUnmatched": "0",
        "total": "315",
        "matchingWeightage": "99.68254" } },
    { "_index": "hubble_validator_training_model",
      "_type": "data",
      "_id": "dnatkcgefh132521073959585",
      "_score": 1,
      "_source": {
        "id": "dnatkcgefh132521073959585",
        "endpoint": "reports/options/VEND_BAL_DET",
        "field": "$.[*].initialValue.dayOfYear",
        "nMatched": 1106940032,
        "nMissing": 23870405,
        "nUnmatched": 0,
        "total": 1130810437,
        "matchingWeightage": 97.889084} },
    { "_index": "hubble_validator_training_model",
      "_type": "data",
      "_id": "gvxcpco7l65563286113024578",
      "_score": 1,
      "_source": {
        "id": "kbcwwxvkqy563286136178671",
        "endpoint": "settings",
        "field": "$.hasClassOnTxn",
        "nMatched": "59",
        "nMissing": "8",
        "nUnmatched": "54",
        "total": "121",
        "matchingWeightage": "48.76033" } }
        •
        •
        •
  ]
}
```

FIELD PROPERTY EXTRACTION AND FIELD VALUE VALIDATION USING A VALIDATED DATASET

BACKGROUND

Software development is the process of creating and maintaining a software application. There are several phases of software development. In the requirement gathering and analysis phase, the various requirements for the software application are determined based on user and infrastructure. In the design phase, the architecture of the software to achieve the requirements are determined and are then implemented in the implementation or coding phase. The software application is tested before being deployed to the production environment. The software application may further be maintained by updating parts of the software application. The various phases of developing software may overlap and may be repeated. For example, later versions of the software application may be created by adding functionality to an earlier version and then tested. By way of another example, after deployment of a software application, a fault may be detected that may require retesting of the software application.

One of the important phases of development of the software application is the testing phase. In the testing phase, the software application is executed with a defined set of input to create output. The output may then be compared against expected output in order to determine whether the software executed properly.

SUMMARY

In general, in one aspect, one or more embodiments relate to a method that includes executing, multiple times, a target application with at least one test input dataset to obtain multiple test output datasets. The test output data sets each include multiple field values for multiple fields. The method further includes comparing the field values with at least one validated output dataset to assign the fields into a match class, an ignore class, and an unknown class, extracting, from the comparing, a field property for a first subset of the fields in the match class, and generating a test result by adding, to the test result, whether a first subset of the field values corresponding to the first subset of the fields satisfies a corresponding field property, and ignoring a second subset of the a second subset of fields classified in the ignore class. The method further includes presenting the test result.

In general, in one aspect, one or more embodiments relate to a system that includes a computer processor, a data repository including at least one validated dataset including at least one test input dataset and at least one validated test output dataset, a target application including application logic and an application programing interface, and an application tester connected to the data repository, and configured to execute on the computer processor. The application tester is configured to invoke, multiple times, execution of the target application with the at least one test input dataset to obtain multiple test output datasets. The test output data sets each include multiple field values for multiple fields. The application tester is further configured to compare the field values with at least one validated output dataset to assign the fields into a match class, an ignore class, and an unknown class, extract, from the comparing, a field property for a first subset of the fields in the match class, and generate a test result by adding, to the test result, whether a first subset of the field values corresponding to the first subset of the fields satisfies a corresponding field property, and ignoring a second subset of the a second subset of fields classified in the ignore class. The application tester is further configured to present the test result.

In general, in one aspect, one or more embodiments relate to a non-transitory computer readable medium including computer readable program code for performing operations. The operations include executing, multiple times, a target application with at least one test input dataset to obtain multiple test output datasets. The test output data sets each including multiple field values for multiple fields. The operations further include comparing the field values with at least one validated output dataset to assign the fields into a match class, an ignore class, and an unknown class, extracting, from the comparing, a field property for a first subset of the fields in the match class, generating a test result by adding, to the test result, whether a first subset of the field values corresponding to the first subset of the fields satisfies a corresponding field property, and ignoring a second subset of the a second subset of fields classified in the ignore class, and presenting the test result. Other aspects of the invention will be apparent from the following description and the appended claims.

BRIEF DESCRIPTION OF DRAWINGS

FIGS. 11, 12, 13, and 14 show examples in accordance with one or more embodiments.

DETAILED DESCRIPTION

Figure 1:
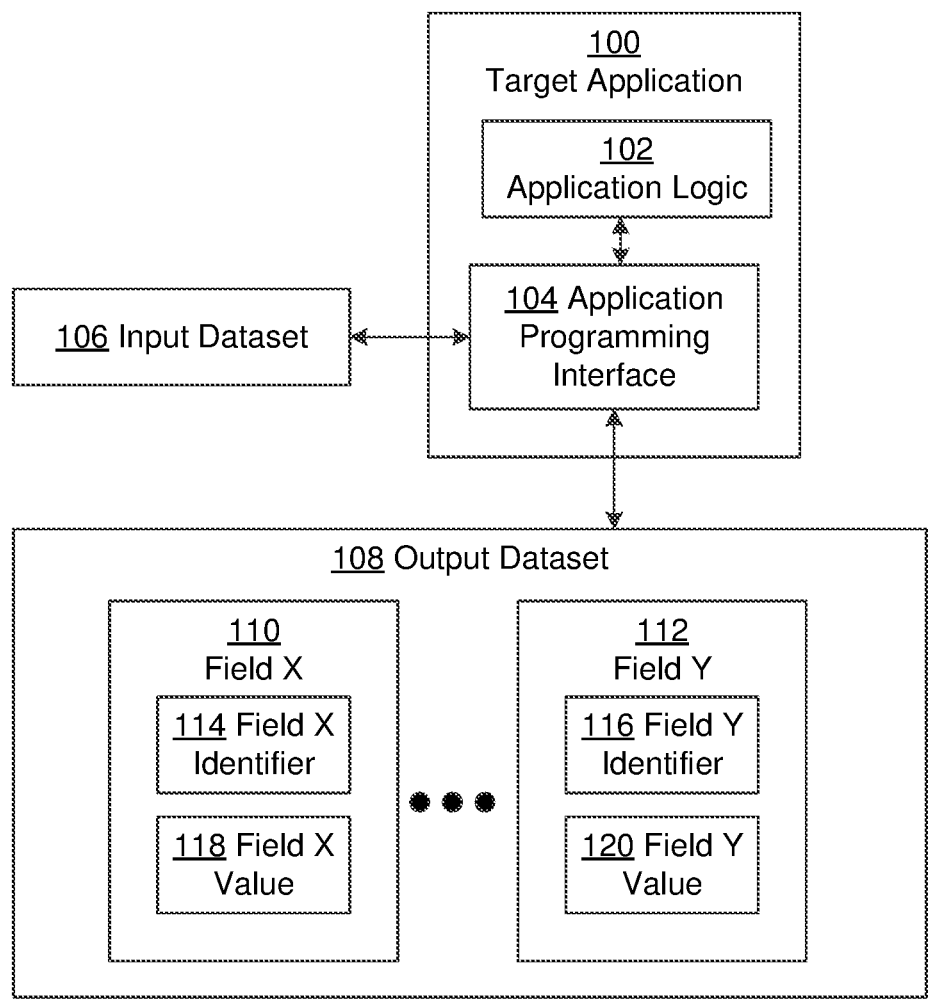
FIGS. 1, 2, 3, 4, 5, and 6 show schematic diagrams in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In order to validate that a target application is functioning properly without defects, multiple layers of testing is performed. Even for a small change in the target application, regression testing is performed. One or more embodiments are directed to training a computer system to test and validate the application programming interfaces (APIs) of the target application. The validation is done against the responses to different sets of requests for different endpoints of the target application, and the validation is used to identify the defects at the API level.

In particular, embodiments of the invention are directed to training a computer system to learn the field properties of fields based on output obtained while testing a target application using a validated dataset. The target application generates values for multiple fields. Each field may be a field identifier, field value pair. Some of the fields are static while other fields are dynamic. For dynamic fields, the field value is execution time dependent. In other words, for the same input, a different execution time may cause different output values for the field and be valid. For static fields, the same output value should be generated. The field property defines whether the field is static or dynamic, and, if dynamic, whether the field matches a regular expression or should be ignored.

In one or more embodiments, a model is trained to intelligently match and ignore fields based on the statistical data obtained from the dataset. For the validation of deterministic responses, a regular expression generator and validator library are implemented. For the matching fields, the current value and the previous value or regular expression (regex) are matched, and a new regex is generated using the regular expression generator. The new regex satisfies the values for the field. For unmatched fields, an additional validation is performed whereby a regex is generated from both the fields, which is then validated against the existing regex that has been generated from the cumulation of responses that created the dataset.

In one or more embodiments, the training is also continuously improved using reinforcement learning. The reinforcement learning helps train the model for indeterministic responses. The output is at least similar to a JSON diff with a modification. Specifically, responses are grouped into three classes, which is displayed with separate color coding: (i) Match class for when an exact match is required (e.g., creating a transaction with amount X on the same date should always result in tax amount Y in the validated response and the invoice amount for actual response created with item amount X doesn't match X+Y) (ii) Ignored class (e.g., fields such as date, time, etc. are ignored except to confirm that the data complies with a regular expression); and (iii) Unknown class in which insufficient data is received to determine whether in match class or unknown class. The aim is to reduce the number of fields in the unknown class to zero.

During testing, the testing validates the API responses received for different endpoints. For each endpoint, a validated response is compared with the actual response. In one or more embodiments, validation is done in multiple levels. The first level is a high level comparison, whereby status codes are compared. Further, the determination is made whether the environment received responses. A next level is a field level validation. Field level comparison determines whether the field matches the field property. For example, the field level comparison may perform JAVASCRIPT object notation (JSON) testing as described above.

Turning now to the figures, FIGS. 1-6 show schematic diagrams in accordance with one or more embodiments. FIG. 1 shows a schematic diagram of a target application (100) with input and output in accordance with one or more embodiments. The target application (100) is any software application or portion thereof that is the target of testing. For example, the target application (100) may be an enterprise application, a web application, a financial management application, an invoicing application, a gaming application, social media application, etc. As shown in FIG. 1, the target application (100) includes application logic (102) and an application programming interface (104). The application logic (102) is the set of computer executable software instructions that perform the functionality of the target application (100). For example, the application logic (102) may include storage and retrieval instructions, calculations and comparisons, and other instructions. The application logic (102) may have one or more defects (i.e., bug). A defect is an error, failure, or fault in the instructions that causes the target application logic to produce an incorrect or unexpected result or to behave incorrectly. Exposure of the defect may be persistent or intermittent.

The application logic (102) is connected to an API (104). In other words, the application logic is communicatively coupled to the API, whereby different portions of the API may issue calls to the application logic. The API is the interface by which other applications issue calls to the target application (100). The API includes multiple endpoints. Each endpoint corresponds to a portion of the target application (100) to which the control may be transferred from the calling application.

The API (104) is configured to receive an input dataset (106). The input dataset is one or more input parameter values that are received for the target application. In one or more embodiments, the input dataset is for a single API call to the target application (100). For example, the input dataset may be an ordered collection of values, field name/field values pairs, etc. Further, the input dataset may be received directly in the API call or referenced in the API call.

The output dataset (108) is the output of the target application (100). The output dataset may be directly in a response or stored by the target application. In one or more embodiments, the output dataset (108) includes a collection of fields (e.g., field X (110), field Y (112)). Each field may include a field identifier (e.g., field X identifier (114), field Y identifier (116)) and a field value (e.g., field X value (118), field Y value (120)). The field identifier is an alphanumeric value that uniquely identifies the field amongst the collection of fields output by the target application (100). The field identifier may be explicitly defined or inferred, such as by ordering of fields, in the output dataset (108). The field value is the value produced by the application logic (102) for the field. The field value may be dependent on the input dataset (106), the execution time, and any defect in the application logic and/or API. The field value may be a defined object type.

Figure 2:
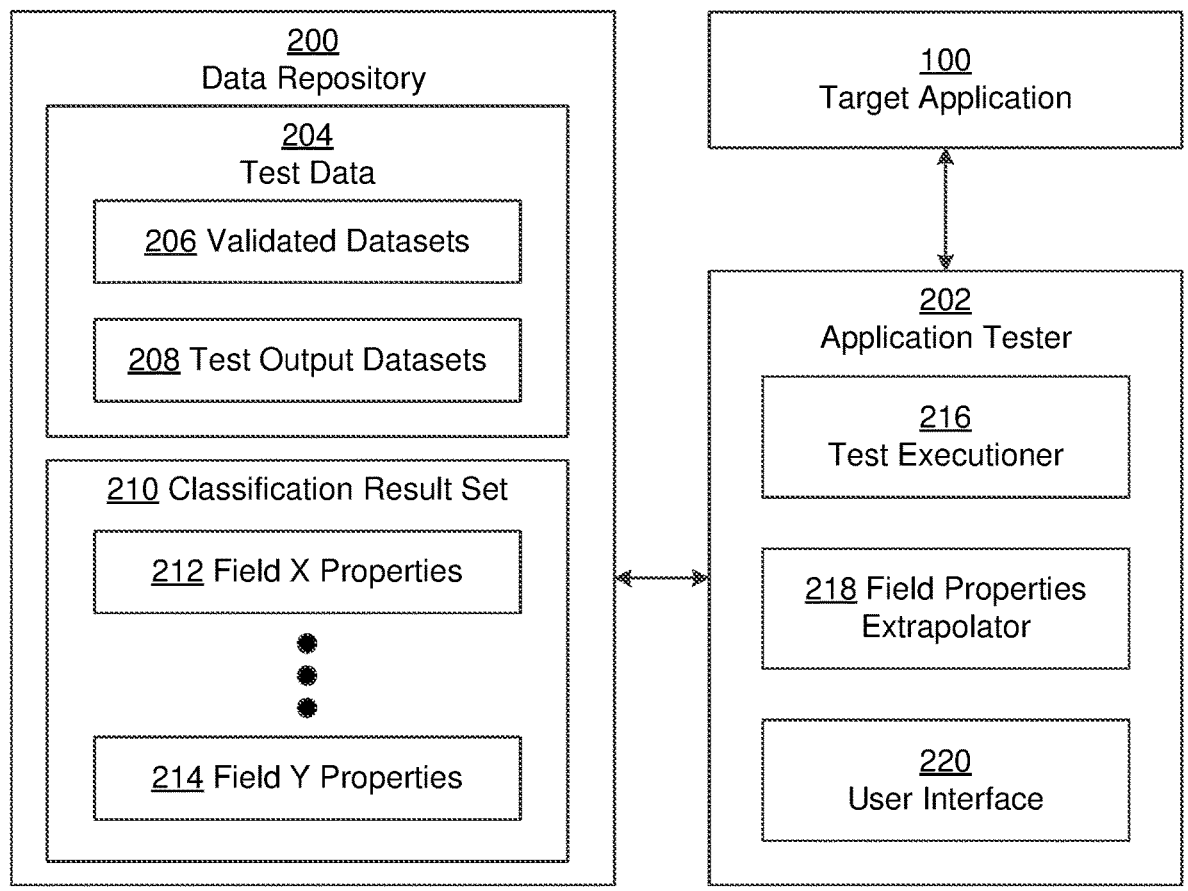

Turning now to FIG. 2, FIG. 2 shows a schematic diagram of a system for testing the target application (100). As shown in FIG. 2, the system includes the target application (100), a data repository (200) and an application tester (202). The target application (100) is the same as the target application (100) described above with reference to FIG. 1.

In one or more embodiments of the invention, the data repository (200) is any type of storage unit and/or device (e.g., a file system, database, collection of tables, or any other storage mechanism) for storing data. Further, the data repository (200) may include multiple different storage units and/or devices. The multiple different storage units and/or devices may or may not be of the same type or located at the same physical site. The data repository (200) includes test data (204) and a classification result set (210). The test data (204) includes the input data that is used as input to the target application (100) and the output data that is output by the target application (100). Specifically, test data (204) includes validated datasets (206) and test output datasets (208). Each dataset corresponds to a single execution of the target application. Multiple datasets may exist, whereby each of the multiple datasets corresponds to different execution times.

A validated dataset (206) is a dataset that is known to be correct. The validated dataset may be created, in whole or in part, by a separate application, created by the target application (100) and validated by a human or a separate application, or otherwise be validated. The validated dataset is described in further detail below with reference to FIG. 3.

The test output datasets (208) are datasets generated by the target application (100) when testing the target application. Each test output dataset may or may not include incorrect output based on whether the target application (100) has a defect. A test output dataset exists for a single execution time. Multiple test output datasets may exist for the same input dataset. In particular, the multiple test output datasets may correspond to different execution times of the target application. The different execution times may be to determine whether defects exist in the target application that are exposed intermittently, based on changes to the target application, for other reasons. Multiple test output datasets may further exist and correspond to different input datasets, such as to test different parts of the target application (100). The test output dataset is described in further detail below and in FIG. 4.

Continuing with the data repository (200) in FIG. 2, the data repository (200) further includes a classification result set (210). The classification result set (210) is the set of fields classified into different classes, and the extracted field properties for each field. The classes are described in further detail in FIG. 6. The classification result set (210) includes field properties (e.g., field X properties (212), field Y properties (214)). The field properties are the properties of a particular output field as determined by the application tester, discussed below. For example, the field properties may include a determined class of the field, a regex that should be matched by the field value, whether the field value should match exactly, a percentage of time in which the field value matches, and other such information. Field properties are discussed in further detail in FIG. 5.

The data repository (200) and the target application (100) are communicatively connected to an application tester (202). The application tester (202) is a software application that is configured to test the target application (100). The testing of the target application is performed contemporaneously with the extraction of field properties for the target application. In other words, with the same output datasets, the application tester (202) learns the field properties and determines whether the target application exhibits defects. The application tester (202) includes a test executioner (216), a field properties extrapolator (218), and a user interface (220).

The test executioner (216) is a software and/or hardware module that is configured to execute tests on the target application. Specifically, the test executioner (216) is configured to issue calls to the target application (100) with one or more input datasets and obtain output datasets from the execution of the target application. The field properties extrapolator (218) is configured to determine field properties for each field. In one or more embodiments, the field properties extrapolator (218) is configured to perform reinforcement learning of field properties. Specifically, a priori knowledge of the field properties does not exist. Through reinforcement learning, the field properties are determined. In one or more embodiments, because the output dataset may have errors, not all output values for the same field are correct. Thus, not all output values match the extrapolated field properties. The field properties extrapolator (218) is configured to learn the field properties even when such errors exist.

In one or more embodiments, the user interface (220) includes functionality to present test results. In one or more embodiments, the user interface may be a graphical user interface. Test results are the output of the application tester and are dependent on the class assigned to each field. Multiple levels of test results may be generated and presented in the user interface. At the target application level, the test results indicates the percentage of tests in which output errors are identified, the amount of the target application tested through the set of tests, whether the target application had defects, and other such test results. At the test level, for each test, the test result may indicate whether an error is determined to exist, the number or percentage of fields having an error, the number or percentage of fields ignored, etc. At the field level, the test results may include the field properties of each field and the pass rate of each field. At the field value level, the test results show the field values generated by the target application for a particular test. The test results may be visually encoded based on the class assigned to each field. For example, when the class assigned to the field is an ignored class, the class may remain in a neutral color. If the class is a match class, one color may be used when the field exists but does not match, another color may be used when a field exists and matches, another color may be used when the field is in the validated output dataset and does not match, and another set of colors may be used based on whether the field does not match the regex for the field.

Figure 3:
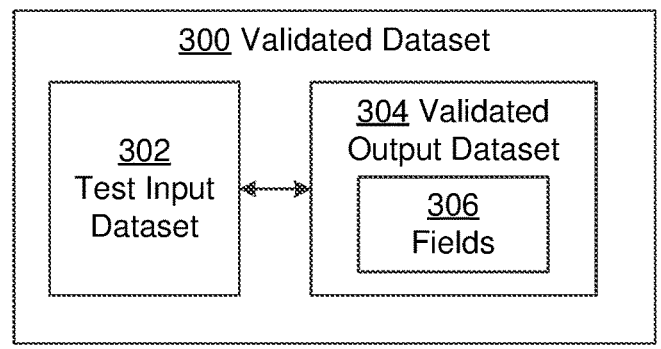

Turning now to FIG. 3, FIG. 3 shows a schematic diagram of a validated dataset (300). As shown in FIG. 3, the validated dataset (300) includes a test input dataset (302) and a validated output dataset (304). The test input dataset (302) is the input dataset, such as input dataset (106), that corresponds to the validated output dataset (304). The validated output dataset (304) is an output dataset, such as output dataset (108), that is validated and corresponds to the test input dataset (302). In other words, when the input dataset (106) is used as input to the target application, a correct response is the validated output dataset (304). As such, the validated output data set may include multiple fields (306), whereby the fields correspond to the fields discussed above with reference to FIG. 1. The validated output dataset may be referred to as a golden response.

Figure 4:
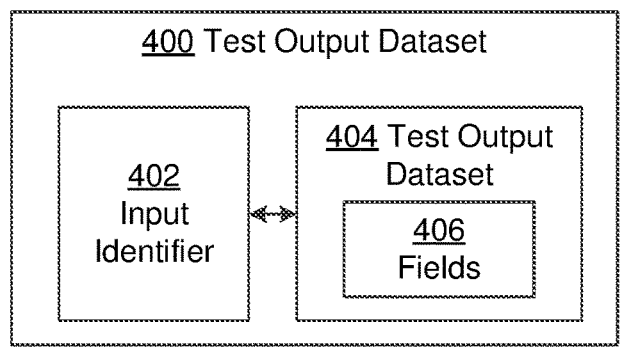

Turning to FIG. 4, a test output dataset (400) is an output dataset that may or may not be valid. In other words, the test output dataset (400) is the result of a test execution of the target application. The test output dataset (400) includes an input identifier (402) that uniquely identifies a test input dataset (e.g., test input dataset (302) in FIG. 3). The input identifier is related in storage to the test output dataset (404), which includes one or more fields (403). When the test output dataset has an input identifier identifying a test input data set that is related to a particular validated output dataset, the particular validated output dataset is said to correspond to the test output dataset. In other words, the particular validated output dataset is a corresponding validated output dataset for the test output dataset. The fields may be the same as the fields discussed above with reference to FIG. 1, for a particular test input dataset. As described above, the fields may vary between the validated output dataset and the test output dataset for the same test input dataset. For example, additional fields may exist, some fields may be removed, and the field values may vary.

Figure 5:
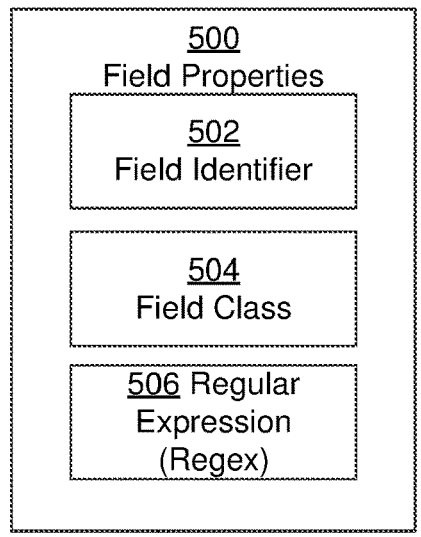

FIG. 5 shows a diagram of field properties (500). The field properties (500) include a field identifier (502), a field class (504), and a regex (506). Field properties may further input test information, such as pass rate for the field, and other properties discussed above with reference to FIG. 2. The field identifier (502) may be the field identifier discussed above with respect to FIG. 1. In one or more embodiments, the field identifier is unique among all possible output fields of the target application (100). Hundreds or thousands of fields may exist. The field identifier uniquely identifies the field across all of the possible fields. The field class (504) is the test class of the field and defines how the field value is interpreted to determine whether the field is valid. The class is discussed in additional detail in FIG. 6. The regex (506) is a sequence of characters that defines a pattern, which the field value matches. For example, the regex may define whether a numeric sequence follows an alphabetic sequence, a number of characters in each sequence, etc. Thus, when the field values do not match exactly, the regex may define the output that constitutes valid output.

Figure 6:
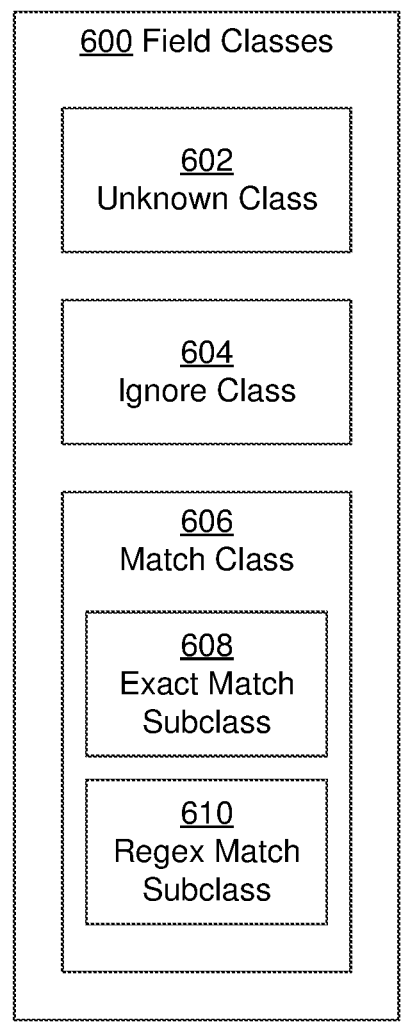

FIG. 6 shows a diagram of field classes (600) in accordance with one or more embodiments. A field may be assigned to a single field class. The class defines how the output is interpreted. The field classes (600) includes an unknown class (602), an ignore class (604), and a match class (606). The unknown class (602) is a class that have fields in which insufficient data exists to determine whether the field value should be ignored or matched. Initially, all fields may be in the unknown class. However, through training, the number of fields in the unknown class (602) is reduced. The ignore class (604) includes the fields whose output is ignored. In other words, for the ignore class, the field value is not used in the test result. By way of an example, the ignore class may include time and date stamps, and other values that change with each test execution.

The match class (606) is the class that includes the fields that are used to determine whether the application has defects. The fields in the match class (606) must match, on some level, the validated output field value in order to be determined to be error free. A failure to match is a determined error in the output dataset. Further, an error in fields in the match class (606) are determined to correspond to defects of the application. The match class (606) includes an exact match subclass (608) and a regex match subclass (610). In the exact match subclass (608), an output field value must match exactly the validated output field value. In the regex match subclass, the field value must match the corresponding regex for the field but does not have to match the validated output field value.

While FIGS. 1-6 show a configuration of components, other configurations may be used without departing from the scope of the invention. For example, various components may be combined to create a single component. As another example, the functionality performed by a single component may be performed by two or more components.

FIGS. 7-10 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 7:
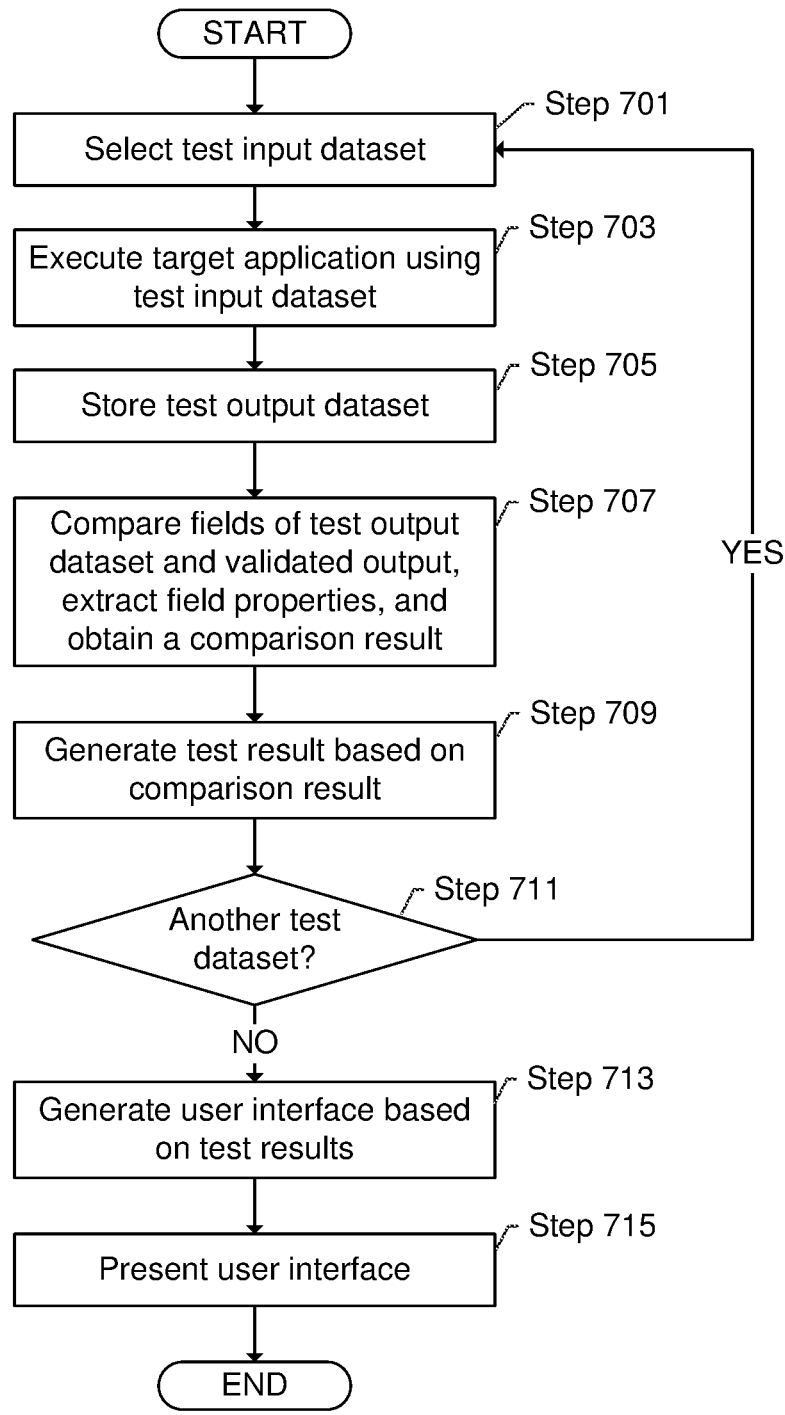
FIGS. 7, 8, 9, and 10 show flowcharts in accordance with one or more embodiments.

Turning to FIG. 7, a flowchart for testing a target application is shown. In Step 701, a test input dataset is selected. The application tester may test the target application with multiple test input datasets. Further, the application tester may test the target application using the same test input dataset multiple times, for different execution times. Each execution time corresponds to a separate call to the target application. The order by which the application tester test various test input datasets may vary and may be configurable. For example, if a known defect is determined to exist and is corrected, the one or more test input datasets that is targeted to test the corrected portion of the target application may be selected. Remaining test input datasets may not be tested. By way of another example, the application tester may iterate through all of the test input datasets and may perform the iteration multiple times.

In Step 703, the target application is executed using the test input dataset. The test executioner issues an API call to the target application. The API call may include the test input dataset or reference the test input dataset. In response, the API of the target application issues corresponding calls to the application logic, which uses the test input dataset as input to execute the target application.

In Step 705, the test output dataset is stored. The target application may store the test output dataset with an identifier and send a reference to the storage location as a response to the test executioner. As another example, the target application may output the test output dataset directly to the test executioner. The test executioner may store the input identifier with the test output dataset.

In Step 707, fields of the test output dataset are compared with the corresponding validated output dataset, field properties are extracted, and a comparison result is obtained. At least initially, the comparison is performed with the corresponding validated output dataset and field properties are determined from the comparison. In general, field properties are determined using a statistical analysis. For example, if, for a threshold percentage of times, a particular field has a field value in the test output dataset that exactly matches the field value in the corresponding validated output dataset, then the field property is set to indicate that the field class is exactly match class. By way of another example, if, for a threshold percentage of times, a particular field has a certain form (e.g., matches a regular expression), then the field property value may be regex match with the regex that matches the field the threshold percentage of time. For example, the threshold percentage for matching may be ninety or ninety five percent. Fields that consistently do not match, either exactly or a regex, or do not match at least a threshold percentage of times may be set as ignore fields. Fields that do not have statistically significant information to classify the field, such as because not enough test output datasets exist having the field or because the field is inconsistent in matching or not matching are classified in the unknown class.

Based on comparing fields to the regex and/or the corresponding validated output dataset, a comparison result is obtained. The comparison result indicates, for each field in the unknown class and the match class, whether the field matched the validated output dataset or regex for the field.

In Step 709, a test result is generated based on the comparison result. The test result includes whether fields exist either in the validated output dataset or the test output dataset that do not exist in the test output dataset or the validated output dataset, respectively. The test result may be generated based on aggregating statistics for each field in the match class and unknown class.

Steps 706 and 709 may be performed in parts or phases or performed after performing Steps 701-705 and 711 multiple times. For example, a test execution run may include testing the target application multiple times with one or more test input datasets. After the test execution run is complete, then the comparison, extracting field properties, and generating the test result may be performed. As another example, the comparison and the generation of the test results may be performed contemporaneously with testing. In particular, after obtaining multiple test output datasets, the field properties may be extracted. After, for at least a subset of fields, the fields are classified into test classes as described above, the comparison result may be obtained. Thus, the system may learn over time.

Continuing with FIG. 7, in Step 713, a user interface is generated based on the test results. The user interface is generated by inserting into different parts of the interface, the values from the test results.

In Step 715, the user interface with the test results is presented. The user interface may be presented by transmitting the user interface, in whole or in part, to a client device for display. By way of another example, the user interface may be presented by displaying the user interface.

Figure 8:
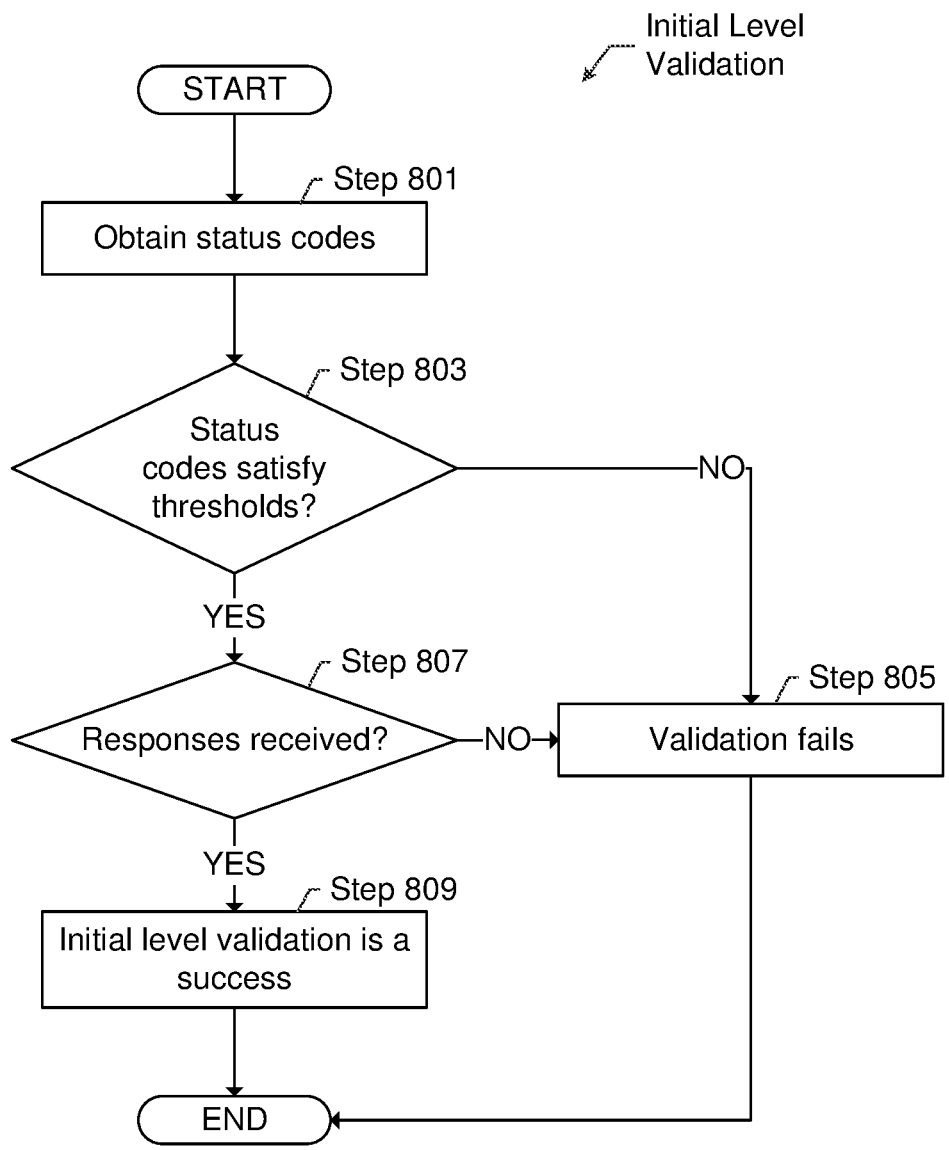

FIG. 8 shows a flowchart for performing an initial level validation. The initial level validation is a high level comparison. In Step 801, status codes are obtained. When an API call is issued, one or more status codes are returned. The status codes indicate whether the request can be successfully processed, or if the client or server has an error. For example, status code 200 means that the request is received and fulfilled while status code 204 means that an incorrect location is used or that there is no information to send back. Status codes in the 400s range indicate that a client error exists, such as unauthorized client or a bad request. Status codes in the 500s range indicates that a server error exists, such as server overload, timeout, or the server does not support the function. Thus, by checking the returned status codes, a determination may be made at a high level whether the target application and any server on which the target application is executing is functioning properly.

In Step 803, a determination is made whether the status codes satisfy a threshold. The threshold may be, for example, 400 for the error codes or 204. Each returned status code is compared against the threshold. If the status codes do not satisfy the threshold, then the validation fails in Step 805. Further validation is not performed. Continuing with FIG. 8, a determination is made whether responses are received in Step 807. In other words, a determination is made whether any output dataset is returned. The determination of whether responses are received may be performed, for example, after the determination is made that the status codes satisfy a threshold. As another example, the determination may be made contemporaneously with the status codes. If responses are not received, then the validation fails in Step 805. If the responses are received, the initial level validation is a success in Step 809. If the initial level validation fails, then no further processing is performed in one or more embodiments. However, if the initial level validation is a success, the flow may proceed to FIG. 9 to perform field level validation.

Figure 9:
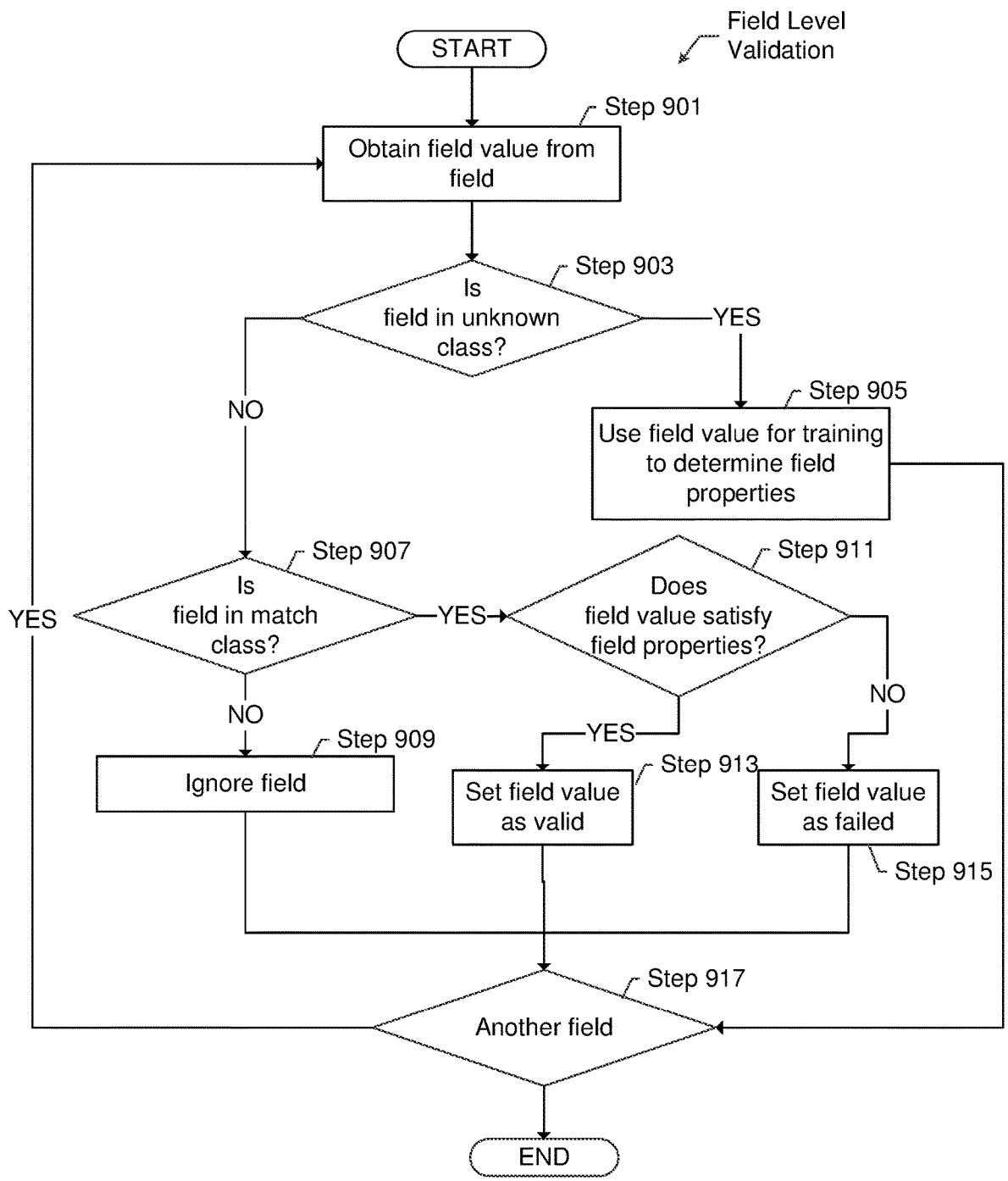

FIG. 9 shows a flowchart for field level validation in accordance with one or more embodiments. In Step 901, a field value is obtained from the field in the test output dataset. The field identifier related to the field value is obtained. The field identifier for the field may be based on the field value being explicitly labeled with the field identifier. As another example, the field identifier may be determined based on the position of the field in the test output dataset.

Based on the field identifier, a determination is made whether the field is in the unknown class in Step 903. The data repository is accessed to obtain the field properties matching the field identifier. From the field properties, the test class is identified. If the test class in the field properties matching the field identifier indicates that the field is in the unknown class, then the flow proceeds to Step 905.

In Step 905, the field is used for training purposes to determine the field properties. As a first level training, the field values may be used to determine whether a statistically significant number of field values exactly match to classify the field in the exactly match test class. If not, the application tester proceeds to use the field value to determine a regex. Using a field for training purposes to generate a regex is described below in reference to FIG. 10.

Continuing with the discussion of Step 905 of FIG. 9, the field value may further be compared against the corresponding field value in the corresponding validated output dataset to determine whether the field value exactly matches the validated output. A separate color encoding scheme may be used in the GUI for fields that have an unknown test class to indicate whether the field values match. For example, if red is used for field values that are in the exactly match class and do not exactly match, yellow or purple may be used for field values that are in the unknown class and do not exactly match. Once a test class of unknown or ignore is determined for a field, previous field values used for training may be reanalyzed based on the new test class.

Returning to Step 903, if the field is not in the unknown test class, the flow may proceed to Step 907 to determine whether the field is in the match class. If the test class in the field properties matching the field identifier indicates that the field is not in the match class, the field properties may indicate that the fields are in the ignore test class. If the field properties indicate that the field is in the ignore test class, the flow proceeds to Step 909 and the field is ignored. Thus, test results do not include the status of the field.

If the test class in the field properties matching the field identifier indicates that the field is in the match class, the flow proceeds to Step 911 to determine whether the field value satisfies the field properties. In particular, if the field properties indicate that the field is in the exactly match subclass, then the field value from the test output dataset is compared against the field value in the corresponding validated output dataset to determine whether an exact match exists. If an exact match does not exist, then the field value is set as failed in Step 915. In other words, the field value is set with a failed identifier. Thus, in the user interface, the field value may be marked as such. If the exact match does exist, the field value is set as valid in Step 913. Thus, in the user interface, the field value may be marked as valid.

Continuing with the discussion of Step 911, if the field properties indicate that the field is in the regex match subclass, then the current regex from the field properties is used. Specifically, a determination is made whether the field value satisfies the current regex. If the field value satisfies the current regex, the flow proceeds to Step 913 to set the field value as valid. If the field value does not satisfy the current regex, the flow proceeds to Step 915 to mark the field value as failed in accordance with one or more embodiments of the invention.

In one or more embodiments, the regex match subclass and the exact match subclass are continually trained. The training may be to create a new regex based on the existing regex, or to ensure that at least a threshold number of field values for the field continue to exactly match the corresponding validated output dataset.

In Step 917, a determination is made whether another field exists in the test output dataset. If another field exists, the flow returns to Step 901 to process the next field.

Figure 10:
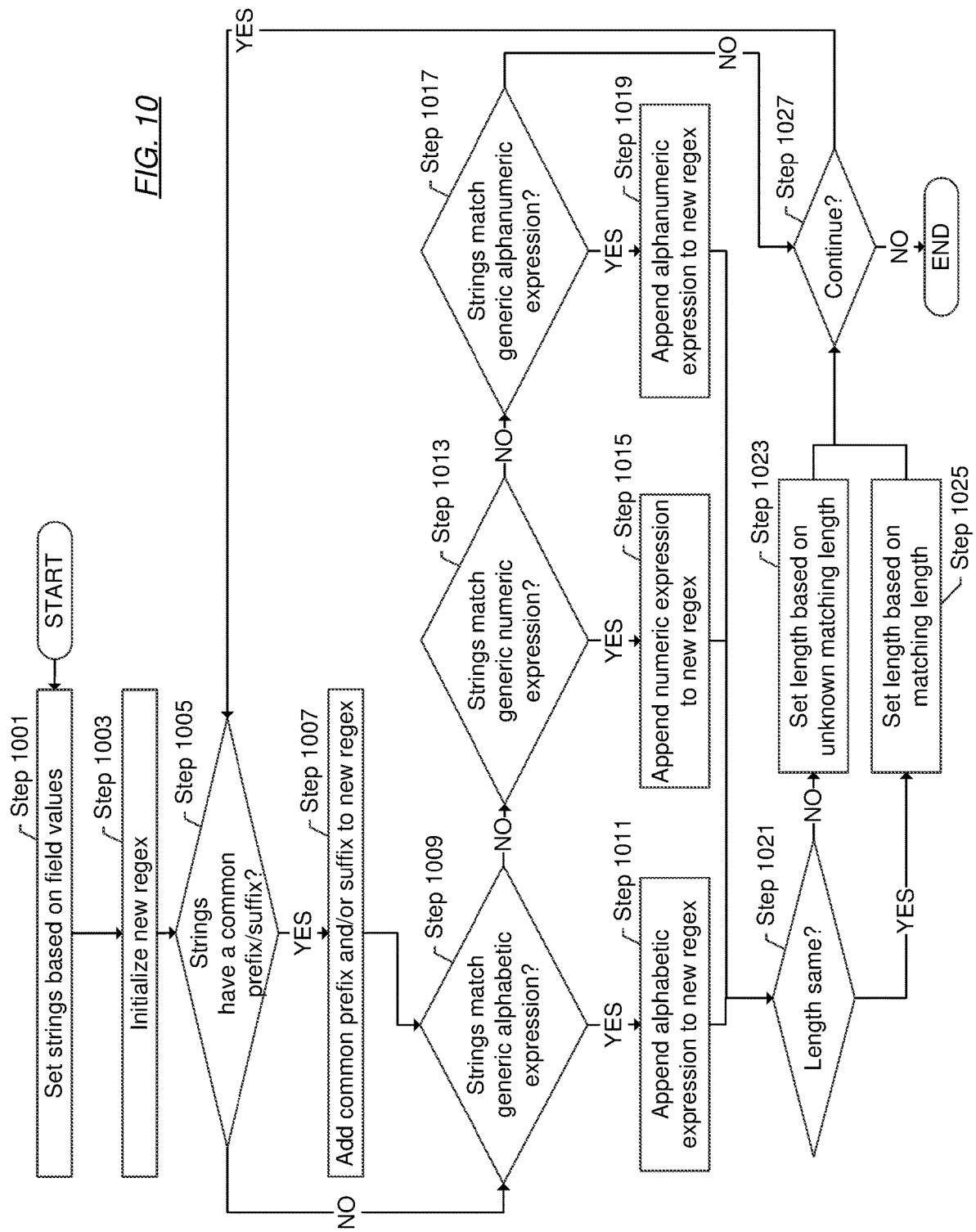

FIG. 10 shows a flowchart for generating a regex in accordance with one or more embodiments. The steps of FIG. 9 are performed for a particular field. In one or more embodiments, for a particular field, a regex is generated once a threshold number of test output datasets are received that include the particular field. The test output datasets may or may not correspond to the same test input dataset. Further, with each new field value for the field or when a threshold number of new field values for a field are received after the regex is initially generated, the regex may be regenerated for the new field value.

In Step 1001, strings are set based on the field values. In one or more embodiments, the field values are treated as strings for the purposes of generating a regex. The existing regex may also be one of the strings.

In Step 1003, a new regex is initialized. The new regex does not have any characteristics of any of the strings in accordance with one or more embodiments.

In Step 1005, a determination is made whether the strings have a common prefix and/or suffix. In particular, a determination is made whether a threshold percentage or number of strings have the common prefix or suffix. If the strings have a common prefix and/or suffix, the common prefix and/or suffix are added to the new regex in Step 1007 in accordance with one or more embodiments. For example, the common prefix or suffix may be one or more punctuation characters, such as a colon, period or semicolon, a set of identical alphabetical characters, etc. By adding the common prefix and/or suffix to the regex, for the comparison, matching field values must also have the common prefix and/or suffix to match the regex.

The flow continues to Step 1009. In Step 1009, a determination is made whether the strings match a generic alphabetic expression. A generic alphabetic expression is one in which each character is in the alphabet. The determination is whether at least a portion of the strings starting at a start point (e.g., far left character or far right character for each string) have only characters that are in the alphabet. If a string is an existing regex, then a determination is made whether at least the portion of the string is the generic alphabetic expression. If a threshold number or percentage of strings match the generic alphabetic expression, then the generic alphabetic expression is appended to the new regex in Step 1011. Further, a determination in Step 1021 is made whether the length of the matching portion of the strings is the same. Namely, a determination is made whether the strings exhibit the same number of characters matching the generic alphabetic expression. If the same number of characters of each string match the generic alphabetic expression, then the length is also set based on the matching length in Step 1025. In other words, the generic alphabetic expression is related to the identifier of the defined matching length in the new regex. If the strings have variable number of characters, then the generic alphabetic expression is related to the identifier of unknown length in the new regex.

Returning to Step 1009, if a determination is made that the strings do not match the generic alphabetic expression, the flow proceeds to Step 1013. In Step 1013, a determination is made whether the strings match a generic numeric expression. A generic numeric expression is one in which each character is a number or a decimal point (i.e., period or comma depending on country). The determination is whether at least a portion of the strings starting at a start point (e.g., far left character or far right character for each string) have only characters that are numeric. If a string is an existing regex, then a determination is made whether at least the portion of the string is the generic numeric expression. If a threshold number or percentage of strings match the generic numeric expression, then the generic numeric expression is appended to the new regex in Step 1015. Further, a determination in Step 1021 is made whether the length of the matching portion of the strings is the same. Namely, a determination is made whether the strings exhibit the same number of characters matching the generic numeric expression. If the same number of characters of each string match the generic numeric expression, then the length is also set based on the matching length in Step 1025. In other words, the generic numeric expression is related to the identifier of the defined matching length in the new regex. If the strings have variable number of characters, then the generic numeric expression is related to the identifier of unknown length in the new regex.

Returning to Step 1013, if a determination is made that the strings do not match the generic numeric expression, the flow proceeds to Step 1017. In Step 1017, a determination is made whether the strings match a generic alphanumeric expression. A generic alphanumeric expression is one in which each character is a number or a decimal point (i.e., period or comma depending on country) or an alphabetic character. The determination is whether at least a portion of the strings starting at a start point (e.g., far left character or far right character for each string) have only characters that are alphanumeric. If a string is an existing regex, then a determination is made whether at least the portion of the string is the generic alphanumeric expression. If a threshold number or percentage of strings match the generic alphanumeric expression, then the generic alphanumeric expression is appended to the new regex in Step 1019. Further, a determination in Step 1021 is made whether the length of the matching portion of the strings is the same. Namely, a determination is made whether the strings exhibit the same number of characters matching the generic alphanumeric expression. If the same number of characters of each string match the generic alphanumeric expression, then the length is also set based on the matching length in Step 1025. In other words, the generic alphanumeric expression is related to the identifier of the defined matching length in the new regex. If the strings have variable number of characters, then the generic alphanumeric expression is related to the identifier of unknown length in the new regex.

Regardless of whether the generically matching expression is alphabetic, numeric or alphanumeric, the matching portions of the strings are removed. A determination is made in Step 1027 whether to continue. The determination is made to continue when more portions of the strings exist. If the determination is made to continue, the flow proceeds to Step 1005.

In some cases, strings do not match a generic expression. In such a scenario, the flow may proceed to determine whether to continue with a different portion of the strings in Step 1027 or whether to end. For example, the determination may be made to end and relate the test class of ignore class to the field. Overtime, as new field values are received, fields in the ignore class may be reanalyzed to determine whether a regex may be generated. If a regex can be generated, the field is removed from (i.e., disassociated with) the ignore class.

Figure 11:
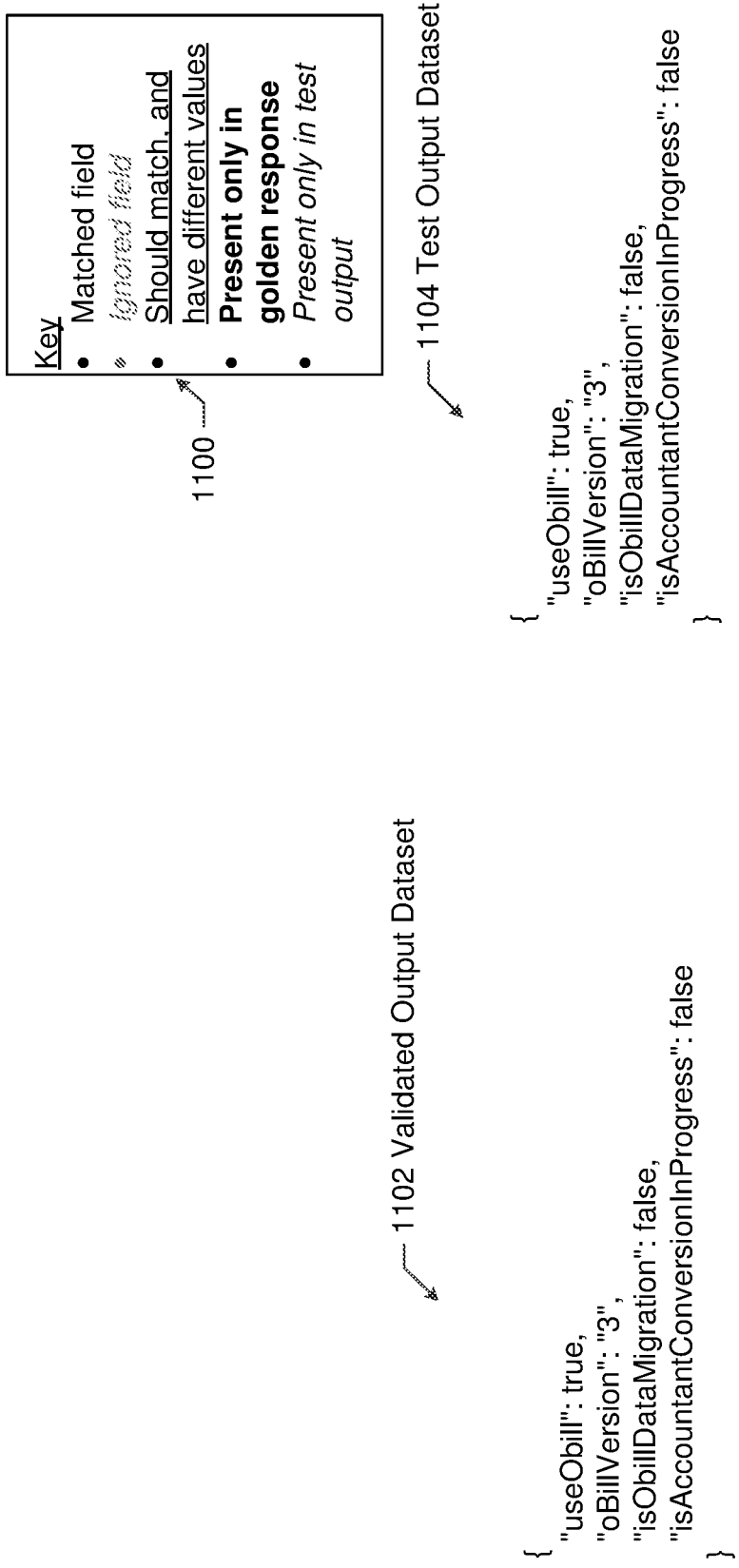
Figure 13:
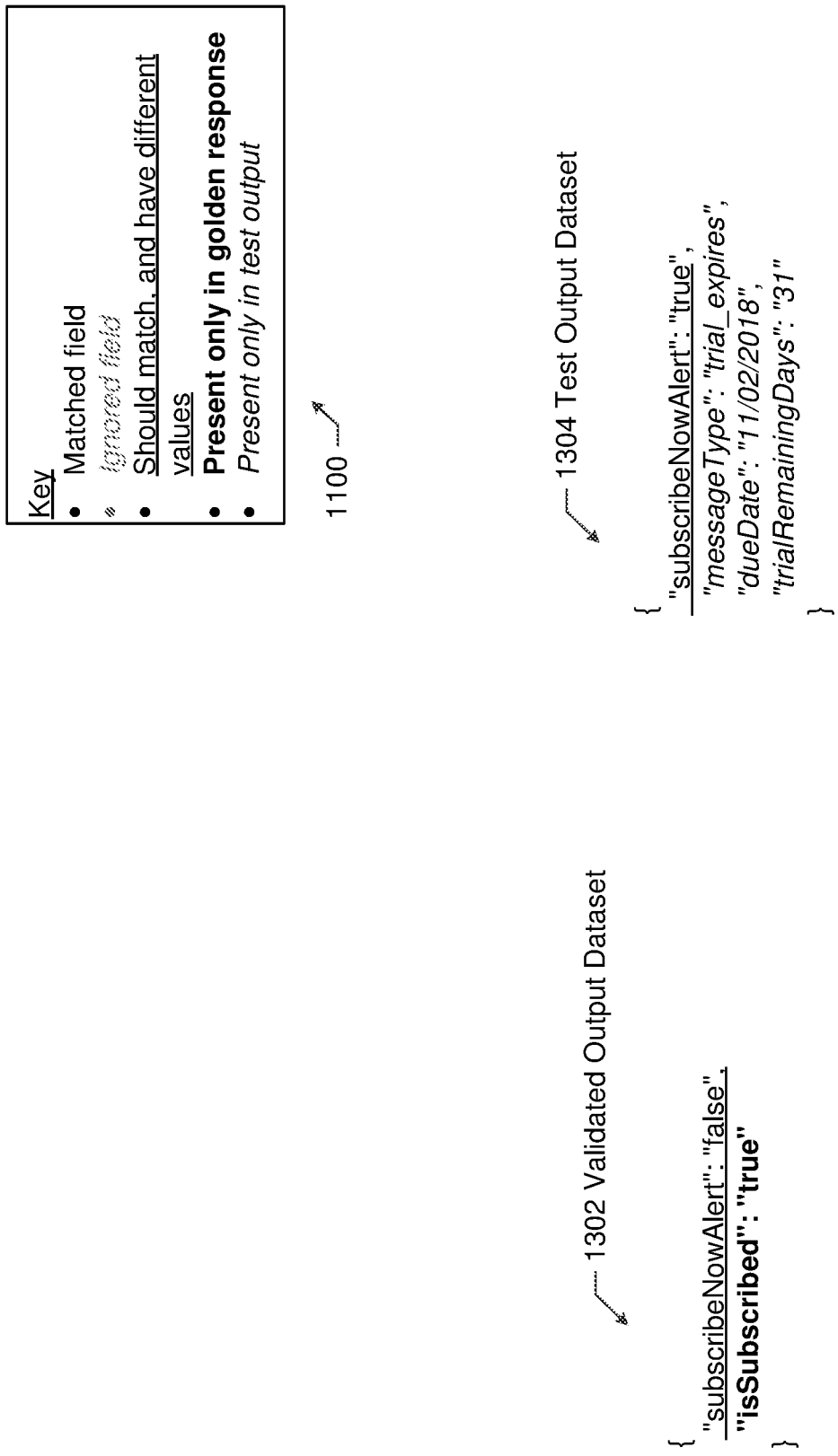

The following example is for explanatory purposes only and not intended to limit the scope of the invention. FIGS. 11-13 provide example output of the user interface from testing a target application. In FIGS. 11-13, left hand side is the validated output dataset for the fields. The right side is the test output dataset. The key (1100) indicates how each portion is determined. As shown by way of the key (1100), for the purposes of the example, the encoding scheme used to show various information is based on greyscale font changes. In the user interface, a color encoding scheme may be used whereby different highlighting colors and/or font colors may represent difference portions. In other words, each portion of the key may be assigned to a different color rather than greyscale font and the test results may be encoded accordingly.

FIG. 11 shows a diagram in which both JSONs for the validated output dataset (1102) and the test output dataset (1104) are identical. Thus, no font encoding is applied as designated by the key.

FIG. 12 shows a diagram in which the differences between the JSONs for the validated output dataset (1202) and the test output dataset (1204) are ignored fields. Thus, the different ignored fields are marked as grey italic as designated by key (1100).

FIG. 13 shows a diagram in which the differences between the JSONs for the validated output dataset (1302) and the test output dataset (1304) are fields that do not exist either in the validated output dataset or the test output dataset. Further, a field has different value. Thus, the missing fields and fields having differing values are marked as designated by key (1100).

FIG. 14 shows an example of a JSON (1400) for an aggregated test result. In particular, testing is performed to generate multiple test output datasets. Information about the comparison of field values for each field is aggregated to create the JSON (1400). Thus, by using the test results in FIG. 14, a user may determine whether the target application has a defect.

Figure 15A:
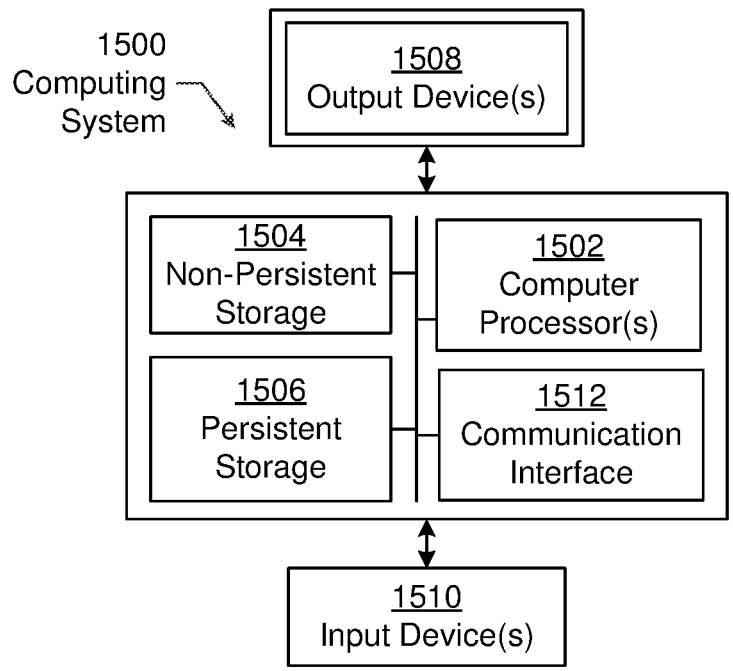
FIGS. 15A and 15B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 15A, the computing system (1500) may include one or more computer processors (1502), non-persistent storage (1504) (e.g., volatile memory, such as random access memory (RAM), cache memory), persistent storage (1506) (e.g., a hard disk, an optical drive such as a compact disk (CD) drive or digital versatile disk (DVD) drive, a flash memory, etc.), a communication interface (1512) (e.g., Bluetooth interface, infrared interface, network interface, optical interface, etc.), and numerous other elements and functionalities.

The computer processor(s) (1502) may be an integrated circuit for processing instructions. For example, the computer processor(s) may be one or more cores or micro-cores of a processor. The computing system (1500) may also include one or more input devices (1510), such as a touchscreen, keyboard, mouse, microphone, touchpad, electronic pen, or any other type of input device.

The communication interface (1512) may include an integrated circuit for connecting the computing system (1500) to a network (not shown) (e.g., a local area network (LAN), a wide area network (WAN) such as the Internet, mobile network, or any other type of network) and/or to another device, such as another computing device.

Further, the computing system (1500) may include one or more output devices (1508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1502), non-persistent storage (1504), and persistent storage (1506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 15B:
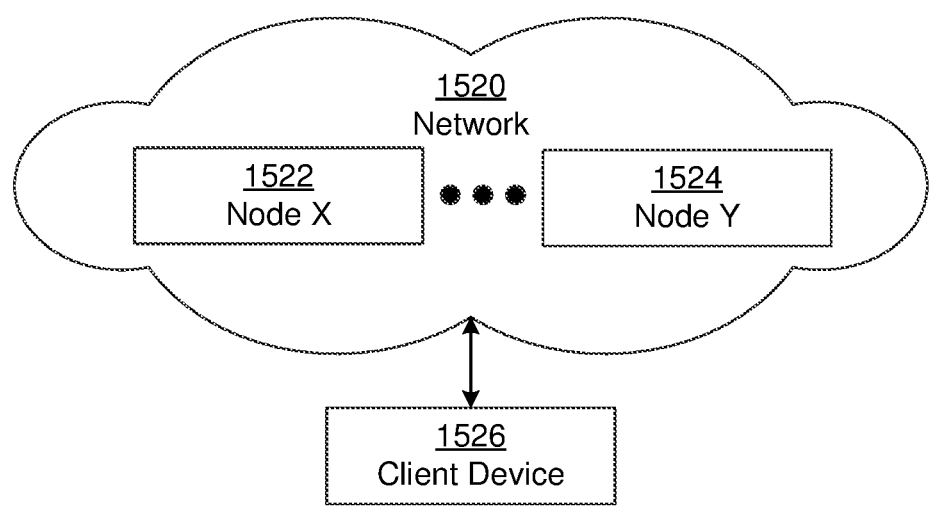

The computing system (1500) in FIG. 15A may be connected to or be a part of a network. For example, as shown in FIG. 15B, the network (1520) may include multiple nodes (e.g., node X (1522), node Y (1524)). Each node may correspond to a computing system, such as the computing system shown in FIG. 15A, or a group of nodes combined may correspond to the computing system shown in FIG. 15A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1500) may be located at a remote location and connected to the other elements over a network.

Although not shown in FIG. 15B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1522), node Y (1524)) in the network (1520) may be configured to provide services for a client device (1526). For example, the nodes may be part of a cloud computing system. The nodes may include functionality to receive requests from the client device (1526) and transmit responses to the client device (1526). The client device (1526) may be a computing system, such as the computing system shown in FIG. 15A. Further, the client device (1526) may include and/or perform all or a portion of one or more embodiments of the invention.

The computing system or group of computing systems described in FIGS. 15A and 15B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 15A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 15A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 15A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 15A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 15A and the nodes and/or client device in FIG. 15B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   executing, a plurality of times, a target application with at least one test input dataset to obtain a plurality of test output datasets, the plurality of test output datasets each comprising a plurality of field values for a plurality of fields;
   comparing the plurality of field values with at least one validated output dataset to classify the plurality of fields into a match class, an ignore class, and an unknown class by:
   for a first field in the plurality of fields of the plurality of test output datasets:
      executing a regular expression (regex) generator using a first subset of the plurality of field values and a validated output value in the at least one validated output dataset, and
      adding the first field to the match class when the regex generator generates a first regular expression (regex);
   extracting, from the comparing, a field property for a first subset of the plurality of fields in the match class;
   generating a test result based on a comparison result,
      wherein the comparison result is obtained by comparing the first subset of the plurality of fields to at least one of the first regex and the validated output value in the at least one validated output dataset, and
      ignoring a second subset of the plurality of fields classified in the ignore class; and
   presenting the test result.

2. The method of claim 1, further comprising:
for a second field in the plurality of fields of the plurality of test output datasets classified to the match class:
determining whether a third subset of the plurality of field values satisfies a threshold for a match exactly property value; and
generating the test result according to a number of the third subset matching the validated output value in the at least one validated output dataset.

3. The method of claim 1, further comprising:
checking a plurality of status codes from the plurality of test output datasets; and
determining that a first level validation is a success when the plurality of status codes satisfies a threshold.

4. The method of claim 1, further comprising:
obtaining, from the plurality of field values, a field value for a second field in the plurality of fields of the plurality of test output datasets;
determining that the second field is classified in the unknown class;
using the field value for training based on determining that the second field is classified in the unknown class; and
training, using the field value, an application tester to reclassify the second field into the ignore class or the match class.

5. The method of claim 1, further comprising:
obtaining, from the plurality of field values, a field value for a second field in the plurality of fields of the plurality of test output datasets; and
ignoring the field value based on determining that the second field is classified in the ignore class.

6. The method of claim 1, further comprising:
obtaining, from the plurality of field values, a field value for a second field in the plurality of fields of the plurality of test output datasets;
determining that the second field is classified in the match class; and
setting, in response to determining that the second field is classified in the match class, the field value as valid when the field value satisfies the corresponding field property for the second field.

7. The method of claim 1, further comprising:
obtaining, from the plurality of field values, a field value for a second field in the plurality of fields of the plurality of test output datasets;
determining that the second field is classified in the match class; and
setting the field value as invalid when the field value does not satisfy the corresponding field property for the second field.

8. The method of claim 1, further comprising:
training an application tester for a second field of the plurality of fields of the plurality of test output datasets by:
setting a plurality of strings in the regex generator to match a subset of the plurality of field values for the second field,
appending to a second regex, a generic expression when the plurality of strings match the generic expression, and
setting a length for the generic expression when the length is the same across the plurality of strings.

9. The method of claim 8, wherein training the application tester further comprises:
adding to the second regex, at least one selected from a group consisting of a common prefix and a common suffix of the plurality of strings.

10. The method of claim 8, wherein the generic expression is one selected from a group consisting of a generic alphabetic expression, a generic numeric expression, and a generic alphanumeric expression.

11. A system comprising:
a computer processor;
a data repository comprising at least one validated dataset comprising at least one test input dataset and at least one validated test output dataset;
a target application comprising application logic and an application programing interface; and an application tester connected to the data repository, and configured to execute on the computer processor, the application tester configured to:
invoke, a plurality of times, execution of the target application with the at least one test input dataset to obtain a plurality of test output datasets, the plurality of test output datasets each comprising a plurality of field values for a plurality of fields;
compare the plurality of field values with the at least one validated output dataset to classify the plurality of fields into a match class, an ignore class, and an unknown class by:
for a first field in the plurality of fields of the plurality of test output datasets: executing a regular expression (regex) generator using a first subset of the plurality of field values and a validated output value in the at least one validated output dataset, and adding the first field to the match class when the regex generator generates a first regular expression (regex);
extract, from the comparing, a field property for a first subset of the plurality of fields in the match class;
generate a test result based on a comparison result,
wherein the comparison result is obtained by comparing the first subset of the plurality of fields to at least one of the first regex and the validated output value in the at least one validated output dataset, and
ignoring a second subset of the plurality of fields classified in the ignore class; and
present the test result.

12. The system of claim 11, wherein the application tester comprises a graphical user interface for displaying the test result, the graphical user interface using different encoding schemes for the first subset of the plurality of fields as for the second subset of the plurality of fields.

13. A non-transitory computer readable medium comprising computer readable program code for performing operations, the operations comprising:
executing, a plurality of times, a target application with at least one test input dataset to obtain a plurality of test output datasets, the plurality of test output datasets each comprising a plurality of field values for a plurality of fields;
comparing the plurality of field values with at least one validated output dataset to classify the plurality of fields into a match class, an ignore class, and an unknown class by: for a first field in the plurality of fields of the plurality of test output datasets: executing a regular expression (regex) generator using a first subset of the plurality of field values and a validated output value in the at least one validated output dataset, and adding the first field to the match class when the regex generator generates a first regular expression (regex);

extracting, from the comparing, a field property for a first subset of the plurality of fields in the match class;

generating a test result based on a comparison result,
   wherein the comparison result is obtained by comparing the first subset of the plurality of fields to at least one of the first regex and the validated output value in the at least one validated output dataset, and
ignoring a second subset of the plurality of fields classified in the ignore class; and presenting the test result.

14. The non-transitory computer readable medium of claim 13, the operations further comprising:
   for a second field in the plurality of fields of the plurality of test output datasets assigned classified to the match class:
      determining whether a third subset of the plurality of field values satisfies a threshold for a match exactly property value; and
      generating the test result according to a number of the third subset matching the validated output value in the at least one validated output dataset.

15. The non-transitory computer readable medium of claim 13, the operations further comprising:
   checking a plurality of status codes from the plurality of test output datasets; and
   determining that a first level validation is a success when the plurality of status codes satisfies a threshold.

16. The non-transitory computer readable medium of claim 13, the operations further comprising:
   obtaining, from the plurality of field values, a field value for a second field in the plurality of fields of the plurality of test output datasets;
   determining that the second field is classified in the unknown class;
   using the field value for training based on determining that the second field is classified in the unknown class; and
   training, using the field value, an application tester to reclassify the second field into the ignore class or the match class.

17. The non-transitory computer readable medium of claim 13, the operations further comprising:
   training an application tester for a second field of the plurality of fields of the plurality of test output datasets by:
      setting a plurality of strings in the regex generator to match a subset of the plurality of field values for the second field,
      appending to a second regex, a generic expression when the plurality of strings match the generic expression, and
      setting a length for the generic expression when the length is the same across the plurality of strings.

18. The non-transitory computer readable medium of claim 17, wherein training the application tester further comprises:
   adding to the second regex, at least one selected from a group consisting of a common prefix and a common suffix of the plurality of strings.

* * * * *

UNITED STATES PATENT AND TRADEMARK OFFICE
CERTIFICATE OF CORRECTION

| | | |
|---|---|---|
| PATENT NO. | : 11,010,287 B1 | Page 1 of 1 |
| APPLICATION NO. | : 16/459211 | |
| DATED | : May 18, 2021 | |
| INVENTOR(S) | : Trilokesh Barua et al. | |

It is certified that error appears in the above-identified patent and that said Letters Patent is hereby corrected as shown below:

On the Title Page

Item (57) ABSTRACT, Line 13, the words "a second subset of" should be removed.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*